United States Patent
Murray

(10) Patent No.: US 8,388,484 B2
(45) Date of Patent: Mar. 5, 2013

(54) RATIO LIMITING ARRANGEMENT

(75) Inventor: Stephen William Murray, Grimsargh (GB)

(73) Assignee: Torotrak (Development) Limited, Leyland, Lancashire (GB)

( * ) Notice: Subject to any disclaimer, the term of this patent is extended or adjusted under 35 U.S.C. 154(b) by 793 days.

(21) Appl. No.: 11/994,405

(22) PCT Filed: Jul. 5, 2006

(86) PCT No.: PCT/EP2006/063926
§ 371 (c)(1),
(2), (4) Date: Aug. 7, 2008

(87) PCT Pub. No.: WO2007/003657
PCT Pub. Date: Jan. 11, 2007

(65) Prior Publication Data
US 2009/0203486 A1 Aug. 13, 2009

(30) Foreign Application Priority Data
Jul. 5, 2005 (GB) .................................. 0513721.1

(51) Int. Cl.
*F16H 37/02* (2006.01)
*F16H 47/04* (2006.01)

(52) U.S. Cl. .............................. 475/208; 475/73; 475/78

(58) Field of Classification Search .................. 475/72, 475/73, 76, 78, 80, 207, 208, 210, 211, 214–219; 474/72
See application file for complete search history.

(56) References Cited

U.S. PATENT DOCUMENTS

| | | | |
|---|---|---|---|
| 3,406,597 A | 10/1968 | Perry et al. | |
| 4,638,687 A * | 1/1987 | De Brie Perry | 475/191 |
| 4,644,820 A | 2/1987 | Macey et al. | |
| 4,813,306 A * | 3/1989 | Kita et al. | 475/80 |
| 5,667,456 A | 9/1997 | Fellows | |
| 5,803,858 A * | 9/1998 | Haka | 475/210 |
| 6,659,901 B2 * | 12/2003 | Sakai et al. | 475/218 |
| 2002/0094904 A1 | 7/2002 | Kuramoto et al. | |
| 2003/0083170 A1 | 5/2003 | Ooyama | |

(Continued)

FOREIGN PATENT DOCUMENTS

EP 0 105 515 A1 4/1984
EP 1 072 819 A2 1/2001

(Continued)

OTHER PUBLICATIONS

PCT International Search Report for PCT/EP2006/063926, mailed Dec. 9, 2006, 3 pages.

(Continued)

*Primary Examiner* — Roger Pang
(74) *Attorney, Agent, or Firm* — Blakely, Sokoloff, Taylor & Zafman LLP

(57) ABSTRACT

An arrangement is disclosed for providing an "end-stop" function for a variator in a continuously variable transmission. The variator (8) needs some arrangement for preventing its own drive ratio from going beyond a ratio limit. In accordance with the present invention, this is provided by means of a one-way clutch (22 or 24). The one-way clutch is coupled to both the variators input and its output, and is arranged to engage (lock up) when the variator reaches its ratio limit, so that the variator is prevented from going beyond the limits. The invention is particularly suited to use with transmissions which provide two regimes and a synchronous change between them.

5 Claims, 1 Drawing Sheet

U.S. PATENT DOCUMENTS

| | | |
|---|---|---|
| 2005/0043138 A1 | 2/2005 | Fuller |
| 2008/0139358 A1 * | 6/2008 | Van Druten et al. .......... 475/210 |

FOREIGN PATENT DOCUMENTS

| | | | |
|---|---|---|---|
| EP | 1 138 981 A2 | | 10/2001 |
| EP | 1 138 981 A3 | | 10/2001 |
| GB | 1078791 | | 8/1967 |
| GB | 2 023 753 A | | 1/1980 |
| GB | 2277133 A | * | 10/1994 |
| JP | 2000-130531 | | 5/2000 |
| JP | 2003-014098 | | 1/2003 |
| JP | 05-187516 | | 7/2003 |
| JP | 2003-194204 | | 7/2003 |
| RU | 2 096 671 C1 | | 11/1997 |
| WO | WO 03/064892 A1 | | 8/2003 |
| WO | WO 2005/015059 A1 | | 2/2005 |

OTHER PUBLICATIONS

Written Opinion of the International Searching Authority for PCT/EP2006/063926, mailed Dec. 9, 2006, 4 pages.

UK Patent Office Search Report for GB0513721.1, dated Oct. 24, 2005, 3 pages.

* cited by examiner

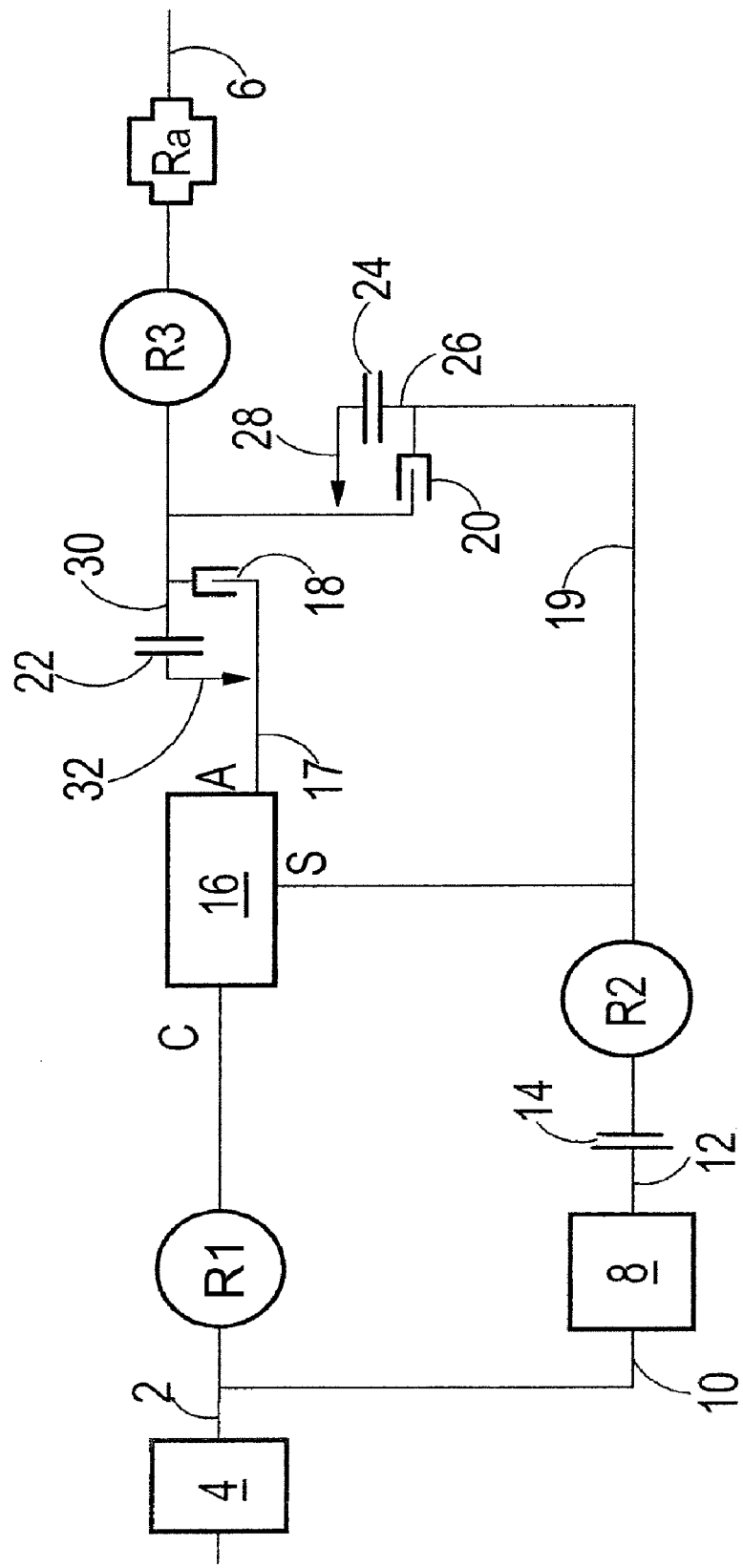

RATIO LIMITING ARRANGEMENT

CROSS-REFERENCE TO OTHER APPLICATIONS

This is a National Phase of International Application No. PCT/EP2006/063926, filed on Jul. 5, 2006, which claims priority from Great Britain Patent Application No. 0513721.1, filed on Jul. 5, 2005.

BACKGROUND OF THE INVENTION

The present invention relates to an arrangement for limiting the drive ratio of a variator in a continuously variable transmission.

In any continuously variable transmission, such as a motor vehicle transmission, there is a device, referred to herein as a "variator", which is responsible for providing the continuous variation of drive ratio. Variators take numerous different forms. For example, some existing automobile transmissions use "belt and sheave" type variators, in which the belt runs on expanding pulleys or sheaves. Another well-known type of variator has one or more pairs of co-axially mounted races, which are shaped to form, together, a toroidal cavity. Drive is transmitted from one race to the other by a set of rollers disposed within the cavity and running upon the races. The inclination of the rollers is variable to change the variator's drive ratio.

The variator typically requires some mechanism, to be referred to herein as an "end stop", for ensuring that the variator is not driven beyond the range of ratios it is able to provide, which could otherwise result in damage. For example, in the toroidal-race type of variator. if the drive ratio, and correspondingly the roller inclination, were to change beyond the acceptable range, then the rollers could be caused to leave the toroidal races altogether, resulting in catastrophic failure. The end-stop function is particularly important in the "torque controlled" type of variator in which ratio is permitted to vary under the influence of torques at the transmission input and output.

It might be imagined that a simple mechanical stop on the travel of the relevant part(s) —on the rollers' inclination, or the pulleys' expansion, for example—would serve the purpose. However this is typically not an ideal solution. To understand why, it is necessary to appreciate that within the variator a balance is required between the torque that the variator is handling and a contact force with which torque-transmitting elements, such as the belt and pulleys, or the rollers and discs, are biased together. If this biasing force is too great then efficiency suffers and wear is unnecessarily increased. If it is inadequate then slippage can take place, which is inefficient but also potentially damaging. The required force varies with the torque being handled, so it is usual to provide some means for varying the biasing force in sympathy with torque. In the toroidal-race type of variator, this can be done through a hydraulic arrangement in which both the biasing force and a reaction force applied to the rollers depend on a common hydraulic pressure. This type of arrangement is described, for example, in Torotrak (Development) Ltd.'s published international patent application PCT/GB2004/002139 (publication number WO2005/015059). The problem created by a mechanical stop is that when it takes effect, a sudden change can be created in the torque upon the variator. Unless the biasing force is correspondingly adjusted, there is a danger of slippage within the variator.

In the type of hydraulically controlled toroidal-race variator just mentioned, the end stop function can be achieved hydraulically, as described in the international patent application just mentioned. Here, the reaction force is applied to the rollers by piston/cylinder arrangements. Supply of the working hydraulic fluid to the cylinders involves side ports that are closed by the pistons when they reach the end of their travel, producing a hydraulic lock to arrest the movement of the pistons and of their associated rollers. The resulting increased hydraulic pressure in the cylinders is passed on to a hydraulic ram providing the biasing force, which is thus automatically increased as necessary.

While highly effective, such end stops are not universally applicable and involve some complication in the controlling hydraulics. An alternative form of end stop is thus desired.

US patent application US2003/0083170, Ooyama, describes a transmission in which a chain drive couples the variator input to a one-way clutch whose other part is coupled to the variator output. The clutch engages to prevent transmission ratio exceeding a chosen maximum. The arrangement involves additional constructional complexity due to its use of a chain drive to provide the required ration and drive transfer from the transmission input to the one-way clutch.

The present inventor has recognised that in certain transmissions a one-way clutch can be used to provide a variator ratio end stop function in a more straightforward manner.

SUMMARY OF THE INVENTION

In accordance with a first aspect of the present invention, there is a continuously variable transmission comprising a rotary transmission input and a rotary transmission output, a variator having a rotary variator input and a rotary variator output between which it is adapted to transfer drive at a continuously variable variator ratio, gearing forming a first drive path which couples the transmission input via the variator to a first shaft so that a first speed ratio, between the transmission input and the first shaft, is a function of the variator ratio and decreases with increasing variator ratio, and gearing forming a second drive path which couples the transmission input via the variator to a second shaft so that a second speed ratio, between the transmission input and the second shaft, is a function of the variator ratio and increases with increasing variator ratio, there being a certain variator ratio ("synchronous variator ratio") at which the speeds of the first and second shafts are equal, the transmission further comprising a selector arrangement to selectively couple either the first shaft or the second shaft to the rotary transmission output to provide first and second transmission regimes, and a one-way clutch arrangement which prevents the speed of the first shaft from exceeding the speed of the second shaft, and so prevents the variator drive ratio from going beyond the synchronous ratio.

In accordance with a broader second aspect of the present invention, there is an arrangement for limiting the ratio of a variator in a continuously variable transmission, the variator having input and output shafts between which it transfers drive at a continuously variable ratio, and the arrangement comprising a one-way clutch, opposite sides of which are drivably coupled to the variator's input and output respectively, the one-way clutch being arranged to freewheel when the variator ratio is within a ratio limit and to engage when necessary to prevent the variator from going beyond its ratio limit.

Because the one-way clutch is coupled to both the variator input and output, once engaged it locks the variator ratio at the chosen limit.

The invention can be implemented with very little additional constructional complexity in a multi-regime type transmission which provides high and low regimes and has a synchronous ratio at which a change between high and low regimes produces no change in transmission ratio. Such transmissions are well known. In this context, the invention can be implemented by arranging the one-way clutch to engage at the synchronous ratio.

There are two routes for transfer of drive through the transmission corresponding respectively to the high and low transmission regimes, opposite sides of the one-way clutch being driven through the respective paths so that at the synchronous ratio the two sides of the one-way clutch are driven at equal speed, causing it to engage.

Where the transmission has at least one regime clutch used to engage one regime or the other, the one-way clutch is preferably coupled in parallel with the regime clutch.

Still more preferably, the transmission comprises two regime clutches, respective one-way clutches being coupled in parallel with both regime clutches and providing the end-stop function in the high and low regimes respectively.

In a particularly preferred embodiment, the transmission has (i) a low regime clutch having an input side coupled to the variator and an output side coupled to the transmission's output so that engagement of the low regime clutch provides low transmission regime; and (ii) a high regime clutch having an input side coupled to the variator and an output side coupled to the transmission's output so that engagement of the high regime clutch provides high transmission regime, the ratio-limiting arrangement comprising (a) a first one-way clutch connected in parallel with the low regime clutch to prevent its input from exceeding its output speed (in the forward gear direction); and (b) a second one-way clutch connected in parallel with the high regime clutch to prevent its output speed from exceeding its input speed (in the forward gear direction).

BRIEF DESCRIPTION OF THE DRAWINGS

Specific embodiments of the present invention will now be described, by way of example only, with reference to the accompanying drawing, which is a highly schematic representation of a continuously variable transmission embodying the present invention.

DETAILED DESCRIPTION OF THE INVENTION

In the drawing, a transmission input shaft 2 is coupled to an engine 4 (or some other form of rotary driver, such as an electric motor) and a transmission output shaft 6 is coupled to driven wheels (not shown) of a motor vehicle. The transmission uses a variator 8 having a variator input shaft 10 and a variator output shaft 12 between which it transmits drive at a continuously variable ratio. The variator input shaft 10 is coupled to the transmission input shaft 2. The variator output shaft 12 is able to be coupled to the transmission output shaft 6 by either of two routes, corresponding to two different transmission regimes, as will now be explained.

Both of the said routes incorporate a torque-limiting clutch 14, one side of which is connected to the variator output shaft 12 while the other is connected to gearing R2. The first route, which corresponds to a low transmission regime, further incorporates an epicyclic shunt 16. Epicyclic gears are well known to those skilled in the art. The shunt 16 has 1. a planet carrier C coupled through gearing R1 to the transmission input shaft 2;
2. a sun gear S which is able to be coupled to the variator output shaft 12 through the torque-limiting clutch 14 and gearing R2; and
3. an annular or ring gear A arranged to be coupled through a low regime clutch 18 and gearing R3, Ra to the transmission output shaft 6.

When the transmission's low regime is selected, by engaging the clutch 18, annular gear A of the shunt is thus coupled via a first shaft 17 and the clutch 18 to the transmission output. A power recirculatory loop is formed, containing the variator 6 and the sun gear S and carrier C of the shunt 16, as is well understood in the art.

The second route for coupling of the variator output shaft 12 to the transmission output is via a second shaft 19 and a high regime clutch 20 which serves, when engaged, to couple the variator output via torque limiting clutch 14, and gearing R2, R3, Ra to the transmission output shaft 6. When the transmission's high regime is selected, by engaging the high regime clutch 20 and disengaging low regime clutch 18, the shunt 16 freewheels and plays no role in transfer of drive through the transmission.

Low regime provides a low range of transmission ratios. Note that transmission and variator ratios are herein defined as output speed divided by input speed. As is well known in the art, by virtue of the use of the shunt 16 this range can include forward and reverse gears, as well as an infinite speed reduction (zero transmission ratio) referred to as "geared neutral". High regime provides higher forward transmission ratios. Note that in high regime an increase in variator ratio produces an increase in transmission ratio, whereas in low regime an increase in variator ratio produces a decrease in transmission ratio. To sweep the transmission right through its ratio range, from reverse to overdrive, low regime is initially engaged with the variator ratio at its maximum. The variator is then swept toward its minimum ratio, moving the transmission through geared neutral to forward. At a certain "synchronous" ratio, high regime is engaged and the variator is then swept back to its maximum ratio, bringing the transmission to its highest gear. "Synchronous" refers in this context to a ratio (of both variator and transmission) at which a change from low to high regime produces no change in the transmission ratio, so that at this ratio a smooth change can be made from one regime to the other. The synchronous variator ratio constitutes a lower limit to the ratio range required of the variator.

In accordance with the present invention, the transmission incorporates one-way clutches, which provide a limit on variator ratio. Specifically, the illustrated embodiment has 1. a first one-way clutch 22 in parallel with—i.e. connected across—the low regime clutch 18 and arranged to prevent the clutch's input speed from exceeding its input speed; and
2. a second one-way clutch 24 in parallel with the high regime clutch 20 and arranged to prevent the clutch's output speed from exceeding its input speed.

The concept of a one-way clutch is well known to those skilled in the art. It has first and second rotary shafts and permits relative rotation of the two shafts in one direction but not in the other. One-way clutches can be implemented using for example ratchet or sprag mechanisms. A sprag type clutch is preferred for the present invention, but other types could be used.

The effect of the first and second one-way clutches is to ensure that variator ratio does not fall below synchronous. Consider the low regime case first of all. The low regime clutch 18 is engaged. The first one-way clutch 22 has no effect, since it is locked up by the low regime clutch. The high regime clutch 20 is disengaged. The second one-way clutch provides the end stop function. It is driven on its input side 26 through the high regime path, via the variator 8, torque-limiting clutch 14 and gearing R2. Its output side 28 is driven through the low regime path comprising inter alia the variator 8, the shunt 16 and the engaged low regime clutch 18. At transmission ratios below synchronous (corresponding to variator ratios above synchronous), the input side 26 is driven faster than the output side 28, so that the second one-way clutch is disengaged. However if the transmission ratio rises to its synchronous value then, by definition, the speeds created by the high and low regime paths are the same. Hence the two sides of the second one-way clutch 24 are driven at the same speed. Any further rise in transmission ratio would cause the output speed of the second one-way clutch 24 to exceed its input speed, but this is prevented by engagement of the clutch. Hence the transmission ratio is prevented from exceeding its synchronous value, and correspondingly the variator ratio cannot fall below its synchronous value.

In the high regime case, the first one-way clutch 22 provides the end-stop function. Its output side 30 is driven through the high regime path comprising variator 8, torque-limiting clutch 14, gearing R2 and engaged high regime clutch 20. Its input side 32 is driven through the recirculatory low regime path comprising inter alia the shunt 16 and variator 8. At transmission ratios above synchronous, its output speed exceeds its input speed, causing it to freewheel. However if the variator and transmission ratios fall to their synchronous values, then by definition the speeds through the high and low regime paths become equal. Any further fall in these ratios is prevented by engagement of the first one-way clutch 22.

In normal operation one or other of the regime clutches 18, 20 is always engaged. The torque-limiting clutch 14 has a protective "fuse" function, its torque capacity being adjusted such that it can carry the expected torque, but will slip in response to unexpected torque "spikes" (e.g. due to sudden braking by the driver), and so prevent these from being borne by the variator.

In the event that some malfunction led to both of the regime clutches 18, 20 being disengaged, the first one-way clutch 22 would typically engage, providing a route for driving of the transmission output (and potentially a "limp home" facility). If ratio were to reach synchronous, then the second one-way clutch would engage, providing the end-stop function.

Note that the illustrated arrangement serves to prevent the variator ratio from falling below synchronous but does not prevent it from rising above its "overdrive" limit. In practice, the overdrive limit is less likely to be reached and protection against this danger can normally be provided by means of the electronics controlling the transmission, but some mechanical or hydraulic overdrive end-stop may also be necessary.

What is claimed:

1. A continuously variable transmission comprising a rotary transmission input and a rotary transmission output, a variator having a rotary variator input and a rotary variator output between which it is adapted to transfer drive at a continuously variable variator ratio, gearing forming a first drive path which couples the transmission input via the variator to a first shaft so that a first speed ratio, between the transmission input and the first shaft, is a function of the variator ratio and decreases with increasing variator ratio, and gearing forming a second drive path which couples the transmission input via the variator to a second shaft so that a second speed ratio between the transmission input and the second shaft, is a function of the variator ratio and increases with increasing variator ratio, there being a certain variator ratio ("synchronous variator ratio") at which the speeds of the first and second shafts are equal, the transmission further comprising a selector arrangement to selectively couple either the first shaft or the second shaft to the rotary transmission output to provide first and second transmission regimes, and a one-way clutch arrangement which prevents the speed of the first shaft from exceeding the speed of the second shaft, and so prevents the variator drive ratio from going beyond the synchronous ratio.

2. A continuously variable transmission as claimed in claim 1 in which the selector arrangement comprises at least one regime clutch and the one-way clutch arrangement comprises at least one one-way clutch connected across the regime clutch to prevent a reversal in the relative rotation of its input and output.

3. A continuously variable transmission as claimed in claim 1 in which the selector arrangement comprises a first regime clutch for selectively coupling the first shaft to the transmission output shaft, and a second clutch for selectively coupling the second shaft to the transmission output shaft, the one-way clutch arrangement comprising a first one-way clutch connected across the first regime clutch and a second one-way clutch connected across the second regime clutch.

4. A continuously variable transmission as claimed in claim 1 in which the first drive path incorporates an epicyclic gear.

5. A continuously variable transmission as claimed in claim 1 in which both drive paths incorporate a torque limiting clutch.

* * * * *